No. 634,256. Patented Oct. 3, 1899.
F. C. ATHERTON.
CRANK SHAFT FOR VELOCIPEDES.
(Application filed Dec. 17, 1898.)
(No Model.)

Witnesses:
Chas. F. Burkhart.
Henry L. Deck.

F. C. Atherton, Inventor.
By Wilhelm & Bonner
Attorneys.

THE NORRIS PETERS CO., PHOTO-LITHO., WASHINGTON, D. C.

UNITED STATES PATENT OFFICE.

FISHER C. ATHERTON, OF BUFFALO, NEW YORK.

CRANK-SHAFT FOR VELOCIPEDES.

SPECIFICATION forming part of Letters Patent No. 634,256, dated October 3, 1899.

Application filed December 17, 1898. Serial No. 699,542. (No model.)

*To all whom it may concern:*

Be it known that I, FISHER C. ATHERTON, a citizen of the United States, residing at Buffalo, in the county of Erie and State of New York, have invented new and useful Improvements in Crank-Shafts for Velocipedes, of which the following is a specification.

This invention relates to crank-shafts having a detachable crank, and more especially to shafts having a tapering flat-sided seat upon which the detachable crank is firmly clamped by a screw-nut applied to the screw-threaded end of the shaft. In such shafts the detachable crank sometimes becomes so tightly bound upon the tapering seat of the shaft as to render its removal very difficult.

The object of my invention is to so construct and combine the clamping-nut with the detachable crank that it serves to loosen as well as tighten the crank, thereby facilitating the removal of the crank without materially increasing the cost of the attachment.

Figure 1:
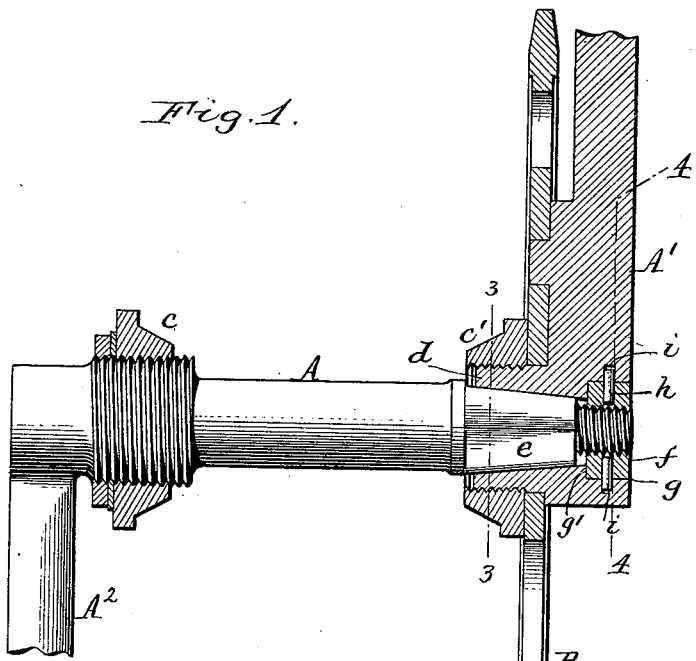
Figure 2:
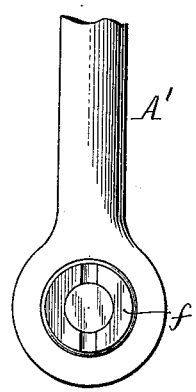
Figure 3:
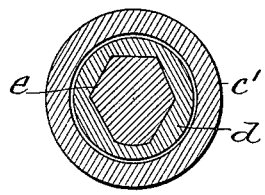
Figure 4:
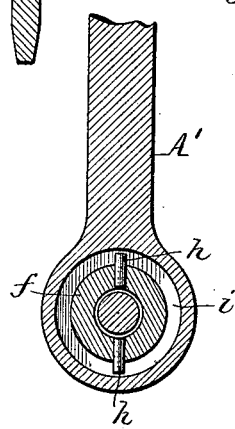
Figure 5:
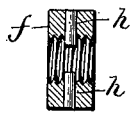

In the accompanying drawings, Figure 1 is a fragmentary sectional elevation of a crank-shaft embodying my invention. Fig. 2 is an outside view of the detachable crank, the end of the shaft, and the clamping-nut. Figs. 3 and 4 are cross-sections in lines 3 3 and 4 4, Fig. 1. Fig. 5 is a detached central section of the clamping-nut, showing the pins retracted into the bore of the nut preparatory to inserting the nut in the recess of the crank-hub.

Like letters of reference refer to like parts in the several figures.

A is the crank-shaft.

A' is the detachable crank, and A² the other crank, which may be formed in one piece with the shaft or separate therefrom, as desired.

B is the sprocket or driving wheel, which may be mounted on the hub of the detachable crank, as shown.

$c$ is the left-hand bearing-cone, which is mounted on the crank-shaft, and $c'$ the right-hand cone, which may be mounted on the externally-screw-threaded hub $d$ of the detachable crank. The inner portion of the bore or socket of the crank-hub is tapered and constructed of angular or flat-sided cross-section and fitted upon the correspondingly-shaped end portion or seat $e$ of the crank-shaft.

$f$ is the screw-nut whereby the detachable crank is clamped upon the shaft and which engages with the screw-threaded end of the shaft. This clamping-nut, which is circular in form, is countersunk in a corresponding recess $g$, formed in the outer face of the crank-hub, and abuts against an internal shoulder $g'$, formed at the junction of the recess and the tapering socket of the crank-hub, so that upon turning the nut forwardly it forces the crank upon the end of the shaft. The nut is provided in its outer face with nicks or notches for turning it with a suitable wrench. In order to cause this same nut to loosen and withdraw the crank from its seat on the shaft, the nut, although permitted to turn in the crank-hub, is held against axial or endwise movement therein, so that upon turning the nut backwardly it draws the hub off its seat. The means shown in the drawings for confining the clamping-nut against endwise movement consists of radial pins or projections $h$, projecting from diametrically opposite sides of the nut and engaging in an annular groove or depression $i$, formed in the circular wall of the nut-recess $g$, as shown in Figs. 1 and 4. These pins are arranged loosely in openings extending radially from the bore to the surface of the nut and are held in their projected position by the screw-stem of the crank-shaft. In interlocking the nut with the detachable crank the pins of the nut are pushed into the bore thereof far enough to bring their outer ends flush with the edge of the nut, as shown in Fig. 5. The nut is then placed in its recess in the crank-hub, and the pins are pushed outward, so as to project into the annular groove $i$ of the hub, in which position they are confined, when the hub is passed over the end of the shaft and the nut is engaged with the screw-threaded end of the shaft.

The loose pins $h$, while preventing the nut from moving lengthwise of the crank-hub, also act as rollers which reduce the friction of the pins against the walls of the annular groove.

The pins $h$ are preferably fitted in the annular groove $i$ with sufficient looseness to allow the screw-nut to abut against the shoulder $g'$ of the crank-boss before the pins come in contact with the inner wall of said groove, so as to relieve the pins from the strain of clamping the detachable crank upon the shaft.

As the same nut is used both for tightening and loosening the detachable crank, my improvement is very simple in construction and convenient in use.

I claim as my invention—

The combination with a crank-shaft having a screw-threaded end, of a detachable crank applied to said shaft and having in the outer portion of its hub-bore an annular recess which is provided in its wall with an annular groove, of a clamping-nut rotatably seated in said recess and provided with a radial opening extending from its bore to its periphery, and a pin arranged in the radial opening of the nut and projecting into the annular groove of the crank-hub, said clamping-nut engaging with the screw-threaded end of the crank-shaft, whereby the shaft retains said pin in its projected position when the parts are assembled, substantially as set forth.

Witness my hand this 29th day of November, 1898.

FISHER C. ATHERTON.

Witnesses:
  JNO. J. BONNER,
  ELLA R. DEAN.